Figure 1:
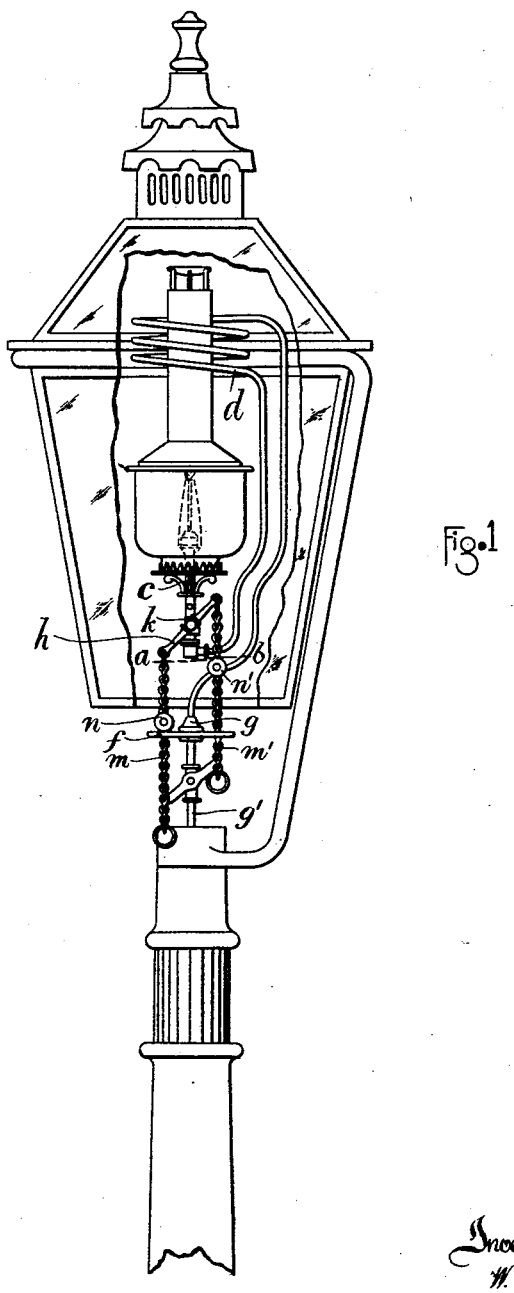

(No Model.) 4 Sheets—Sheet 1.

W. R. CLAY & B. WALMSLEY.
ATTACHMENT FOR INCANDESCENT GAS BURNERS.

No. 590,360. Patented Sept. 21, 1897.

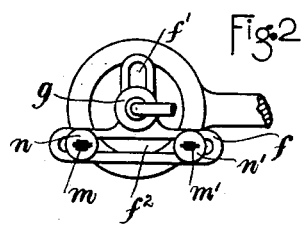
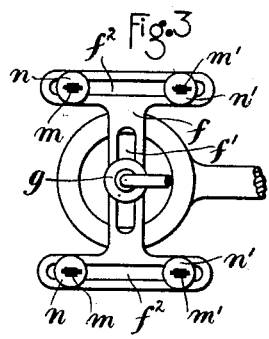
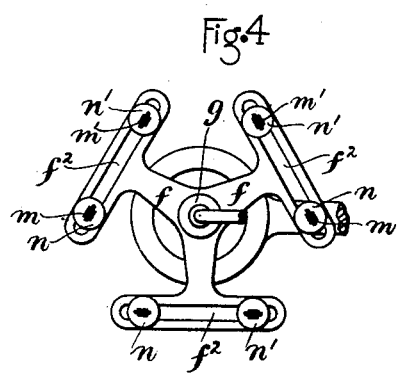
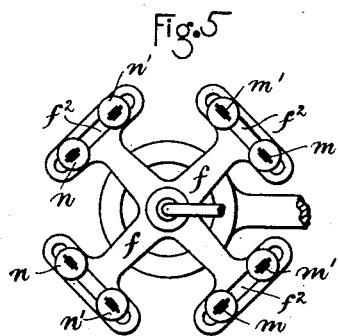
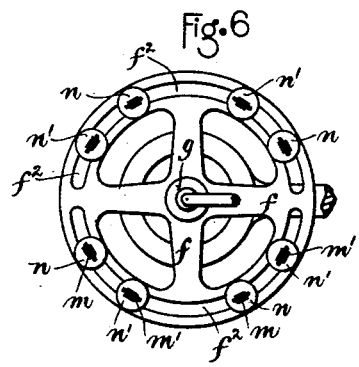
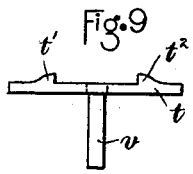

(No Model.) 4 Sheets—Sheet 3.
W. R. CLAY & B. WALMSLEY.
ATTACHMENT FOR INCANDESCENT GAS BURNERS.
No. 590,360. Patented Sept. 21, 1897.
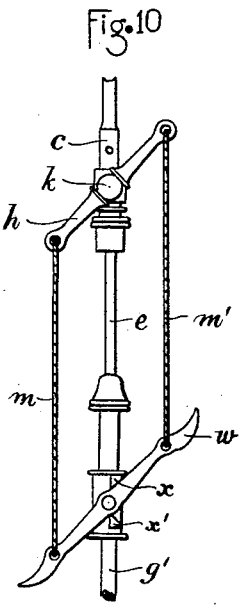
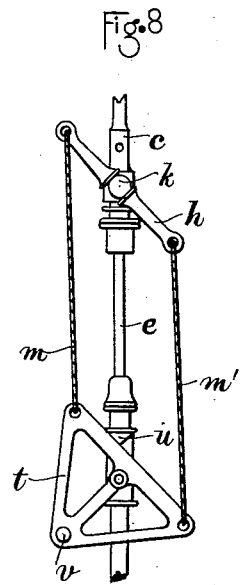
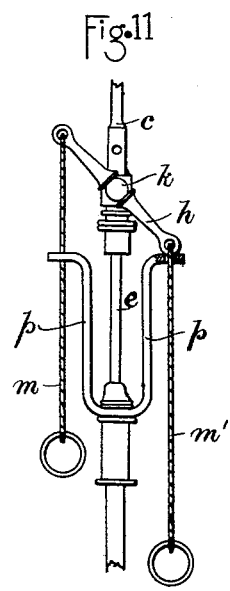
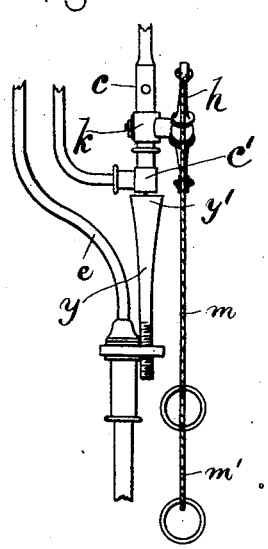
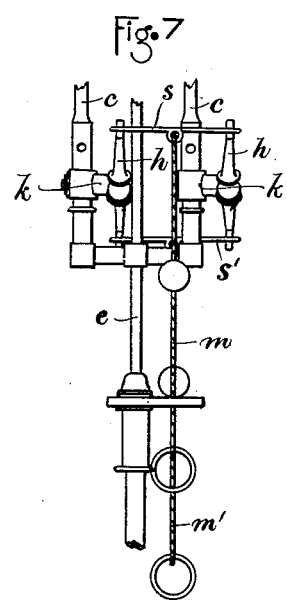
Witnesses
A. D. Harrison
P. W. Pezzetti
Inventors
W. R. Clay
B. Walmsley
by Knight Brown & Quinby
Attorneys (No Model.) 4 Sheets—Sheet 4.
W. R. CLAY & B. WALMSLEY.
ATTACHMENT FOR INCANDESCENT GAS BURNERS.
No. 590,360. Patented Sept. 21, 1897.
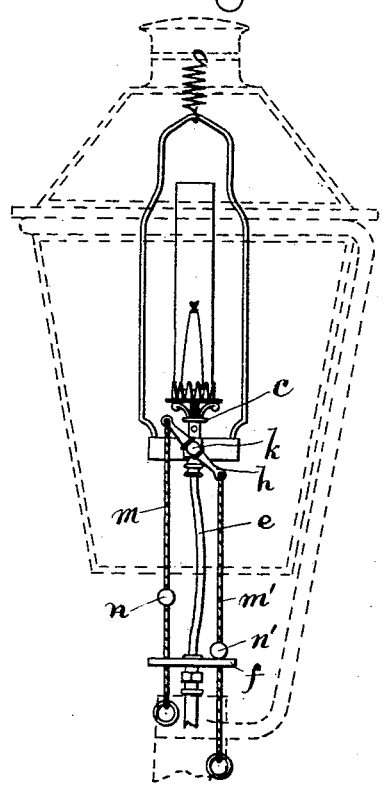
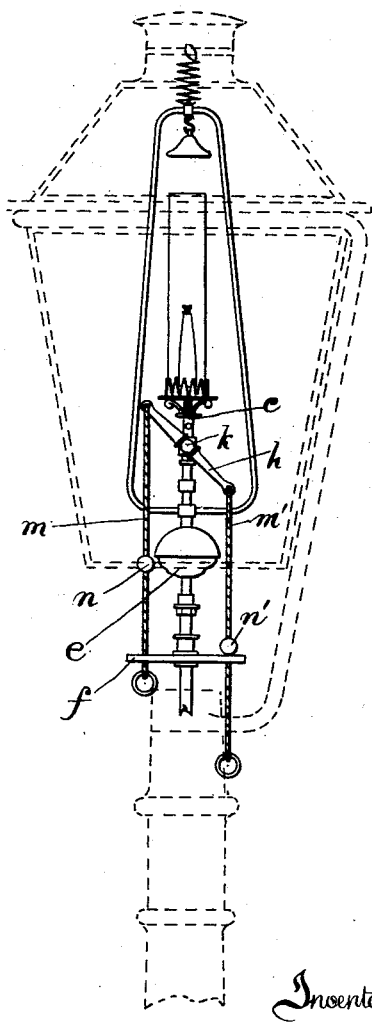
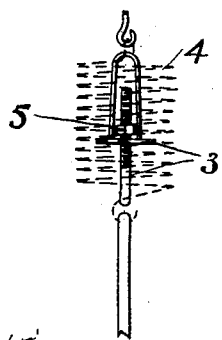
Witnesses
A. D. Henson
P. W. Pezzetti
Inventors
W. R. Clay
B. Walmsley
by Knight Brown & Quinby
Attorneys

UNITED STATES PATENT OFFICE.

WILLIAM RICHARD CLAY AND BEN WALMSLEY, OF BOLTON, ENGLAND.

ATTACHMENT FOR INCANDESCENT GAS-BURNERS.

SPECIFICATION forming part of Letters Patent No. 590,360, dated September 21, 1897.

Application filed January 23, 1897. Serial No. 620,380. (No model.)

*To all whom it may concern:*

Be it known that we, WILLIAM RICHARD CLAY and BEN WALMSLEY, subjects of the Queen of Great Britain, residing at 12 Great Moor Street, Bolton, Lancaster county, England, have invented a new and useful Attachment for Incandescent Gas-Burners, of which the following is a specification.

In connection with incandescent gas-burners which are supported by resilient bearings or yielding supports and which have the taps for regulating or allowing and arresting the flow of gas thereto mounted upon them, so as thus to be also carried by these yielding bearings, it is well known that in order to act efficiently to protect the fragile incandescent mantle or body against the damaging effects of shocks, jars, and other jerky movements these resilient or yielding bearings must be only of sufficient strength to support or sustain said burners and taps, for which reason when any extra force or weight is brought to act or bear upon them they are readily pulled or forced out of position and thereby damaged, as will be also the fragile mantle used in connection with them. To obviate this defect by producing means that may be readily mounted in position for the purpose of preventing those who may turn the tap to allow or to stop the flow of gas to the burner from putting too much weight upon or exercising too great a power over said tap, by which extra weight or power they would pull the burner out of position, is the object of this invention, and this object we attain by the devices hereinafter explained and as illustrated by the accompanying sheets of drawings, in which—

Figure 1 is an elevation of a street-lamp with a portion shown as cut away so that the resilient bearings for the burner and our improved attachment thereto may be more clearly seen. Fig. 2 is a sectional view on line $a\,b$ of Fig. 1 and as seen from above. Figs. 3, 4, 5, and 6 are similar views to Fig. 2, but illustrate the formation of our improved attachment when used in connection with two, three, four, and five or more burners, respectively, when same are supported or mounted in close proximity with each other. Fig. 7 is an elevation showing how our attachment when formed as illustrated by Figs. 1 and 2 may be used in connection with two burners. Figs. 8 and 9 are elevation and plan views, respectively, of a modified form of our device. Fig. 10 is an elevation also showing a modification in the formation of our improved attachment. Fig. 11 is an elevation showing our improved attachment constructed so as to reach or extend into contact with the tap's operating-lever, thus dispensing with certain parts, as is hereinafter explained. Fig. 12 is an elevation illustrative of a device whereby any excessive movement of the burner is prevented by arranging it so as to come into contact with a stop-piece that is entirely clear of the tap's operating-lever. Figs. 13 and 14 are similar views to Fig. 1, but illustrate our improved attachment in connection with resilient bearings having differently-formed flexible supply-pipes. Fig. 15 is a drawing illustrative of a modified form of stop-piece hereinafter explained.

In Fig. 1 the burner $c$ is shown as being supported by a coiled supply-pipe $d$, which forms its resilient bearings, while in Figs. 7, 8, 10, and 11 the resilient bearings (which may be any of the well-known kind, as a spiral or other class of spring) are not shown, yet we would have it understood that the said burners $c$ (which also are only partly shown) are supported by resilient bearings, while their supply-pipes $e$ are of india-rubber or of other flexible or elastic substance or substances, as shown by Figs. 13 and 14, respectively, and do not support the burners $c$.

To carry our invention into effect, we construct a stop-piece $f$ so that we may secure upon it the fixed or rigid part $g$ of the gas-supply pipe $g'$, its slot $f'$ enabling us to adjust it relatively with the lever $h$ of the tap $k$ in order that its slot $f^2$ may be in a suitable position for the chains (or these may be cords or the like) $m\,m'$, secured to the outer ends of the lever $h$, to pass through it. On these chains $m\,m'$ we secure small hoops or balls $n\,n'$, which are too large to pass through the slot $f^2$, so that by securing them in the proper position on their chains $m\,m'$ (one hoop—say $n$—being in contact with the stop-piece $f$ when the lever $h$ is in position shown by Fig. 1, at which time the hoop $n'$ is raised clear of it, while when the chain $m'$ is pulled or forced down the hoop $n'$ will descend into contact with said piece $f$ and the other hoop $n$ will be lifted from contact with it, the two said positions of the lever $h$ being the closed and open positions of their tap $k$, or vice versa) it will be seen that it is impossible for any force greater than is necessary to open the tap $k$ to be transmitted thereto through the operating-chains $m\,m'$, since when said chains are moved to open or close said tap $k$ any further movement of them is prevented and the extra force transmitted to them is withstood by the stop-piece $f$.

The stop-pieces $f$ (shown by Figs. 3, 4, and 5) are respectively arranged to meet the requirements when two, three, and four burners are grouped together, while that shown by Fig. 6 will answer the purposes of any one or all of these or even when more than four burners are grouped together.

The arrangement shown by Fig. 11, wherein the stop-piece $f$ is made to extend so that the ends of the lever $h$ may come into contact with it, is a device whereby the hoops $n\,n'$ may be dispensed with and yet the object of our invention is thereby attained.

In Fig. 7 an arrangement is illustrated of two burners $c$ with their levers $h$ joined together by bars $s\,s'$, so that two chains $m\,m'$ are required for operating them, while the single stop-piece $f$ will answer for both.

Provided inconvenience is encountered in the application of any of the stop-pieces above described the projecting stop-piece $y$ (shown by Fig. 12) may be used, in which case on the cord $m$ or $m'$ being pulled down the whole burner $c$ descends, so that its lower surface $c'$ enters the hollowed end $y'$ of said stop-piece $y$ and is thereby held securely in both the vertical and lateral directions, while when the cord is released the resiliency of its bearings raises said burner $c$, so that its end $c'$ is entirely clear of the stop-piece $y$, which is thus free to act as is desired of it.

Instead of the stop-piece $f$ being used an extra lever $t$ may be employed, while a projecting piece $u$ (see Fig. 8) arrests it in its extreme positions; or projections $t'\,t^2$ (for overhanging the supply-pipe $g$) may be formed on this lever $t$, as shown by Fig. 9, instead of the projection $u$ being employed, while by the projecting arm $v$ the said lever $t$ may be operated as desired; or, again, instead of the lever $t$ a simple lever $w$ may be employed, as shown by Fig. 10, in which case projections $x\,x'$, formed on the supply-pipe $g$, determine the extent of the path through which the lever $w$ is permitted to be moved; or, again, a similar result is attained by the stop-link 3, mounted within the resilient bearing-spring 4, (shown by Fig. 15,) in which case on the burner being pulled down the nut 5 comes into contact with the said link 3 and so prevents further motion, while, since the distance between the nut 5 and link 3 is only very little it is impossible for the burner to be thereby jerked on unduly shaken.

Having thus described our invention, what we claim is—

1. As an attachment for an incandescent gas-burner having the valve-operating lever as well as the burner supported by resilient bearings, a stop-piece formed so that it may be rigidly secured in position, chains or cords secured to the arms of the lever for operating the tap of said burner and hoops or other pieces secured to said chains or cords substantially as set forth.

2. In combination with an incandescent gas-burner and its valve-operating lever supported by resilient bearings, a stop-piece slotted to allow its adjustment, chains or cords secured to the lever-arms for operating the tap of said burner, and means secured on said chains or cords for arresting same by coming into contact with the stop-piece substantially as set forth.

3. In combination with two or more incandescent gas-burners and their valve-operating levers supported by resilient bearings, a stop-piece formed so that the cords or chains from the lever-arms of the taps on said burner may pass therethrough, said chains or cords and means secured on said chains or cords to come into contact with said stop-piece, substantially as herein specified.

4. In combination with an incandescent gas-burner and its valve-operating lever supported by resilient bearings, a stop-piece arranged to prevent said burner from descending too far or moving in a lateral direction on its tap being opened or closed and chains secured to said tap for operating it substantially as herein specified.

5. In combination with an incandescent gas-burner and its valve-operating lever-arms supported by resilient bearings a lever arranged so that the cords or chains from the lever-arms of the tap on said burner may be secured thereto and a projecting piece or pieces rigidly fixed for arresting said lever at the extent of its path in each direction substantially as specified.

6. In combination with an incandescent gas-burner and its valve-operating lever supported by resilient bearings, a lever arranged so that the cords or chains from the tap-operating lever on said burner may be secured thereto, said cords or chains, and projecting pieces formed on the last-mentioned lever for arresting it at the extent of its path in both directions substantially as set forth.

WILLIAM RICHARD CLAY.
BEN WALMSLEY.

Witnesses:
A. D. HARRISON,
JOHN WHITEHEAD.